(12) United States Patent
Qu et al.

(10) Patent No.: US 6,727,621 B1
(45) Date of Patent: Apr. 27, 2004

(54) MOTOR-BASED ELECTRICAL POWER SUPPLY

(75) Inventors: Ronghai Qu, Clifton Park, NY (US); Thomas J. Tyska, Watertown, NY (US)

(73) Assignee: Northland/Scott Fetzer Company, Watertown, NY (US)

(*) Notice: Subject to any disclaimer, the term of this patent is extended or adjusted under 35 U.S.C. 154(b) by 0 days.

(21) Appl. No.: 10/420,631

(22) Filed: Apr. 22, 2003

(51) Int. Cl.[7] .................... H02K 47/04; H02K 47/14; H02K 47/20
(52) U.S. Cl. .................... 310/113; 310/179; 322/20
(58) Field of Search .................... 310/113, 112, 310/179; 322/20, 78, 10; 290/52

(56) References Cited

U.S. PATENT DOCUMENTS

| | | | |
|---|---|---|---|
| 4,720,662 A | | 1/1988 | Lanser |
| 5,350,991 A | | 9/1994 | Bae |
| 5,408,165 A | | 4/1995 | Voet |
| 5,659,205 A | * | 8/1997 | Weisser .................... 290/52 |
| 5,714,821 A | * | 2/1998 | Dittman .................... 310/179 |
| 5,747,971 A | * | 5/1998 | Rozman et al. .................... 322/10 |
| 5,798,622 A | * | 8/1998 | Hirai et al. .................... 318/16 |
| 5,861,693 A | | 1/1999 | Takahashi |
| 5,920,162 A | * | 7/1999 | Hanson et al. .................... 318/254 |
| 6,013,963 A | | 1/2000 | Shelton, Jr. |
| 6,051,959 A | * | 4/2000 | Tupper .................... 322/78 |
| 6,127,800 A | * | 10/2000 | Kuki et al. .................... 320/108 |
| 6,163,137 A | * | 12/2000 | Wallace et al. .................... 322/20 |
| 6,304,014 B1 | * | 10/2001 | England et al. .................... 310/68 B |
| 6,380,655 B1 | | 4/2002 | Ide et al. |
| 6,396,186 B1 | | 5/2002 | Post |

* cited by examiner

Primary Examiner—Thanh Lam
(74) Attorney, Agent, or Firm—Jones Day

(57) ABSTRACT

An apparatus comprises a stator coil for conducting an electrical input current to activate the stator coil. A magnetic structure is for magnetically interacting with the stator coil to produce mechanical output power and is electrically isolated from the stator coil. The mechanical output power is output by an output shaft fixed to the magnetic structure. The apparatus further comprises a pickup coil configured to be electromagnetically coupled to the stator coil and the magnetic structure to induce an electrical output current. The output current is output by an output line electrically connected to the pickup coil. An electrical load is electrically connected to the output line to be powered by the electrical output current.

33 Claims, 5 Drawing Sheets

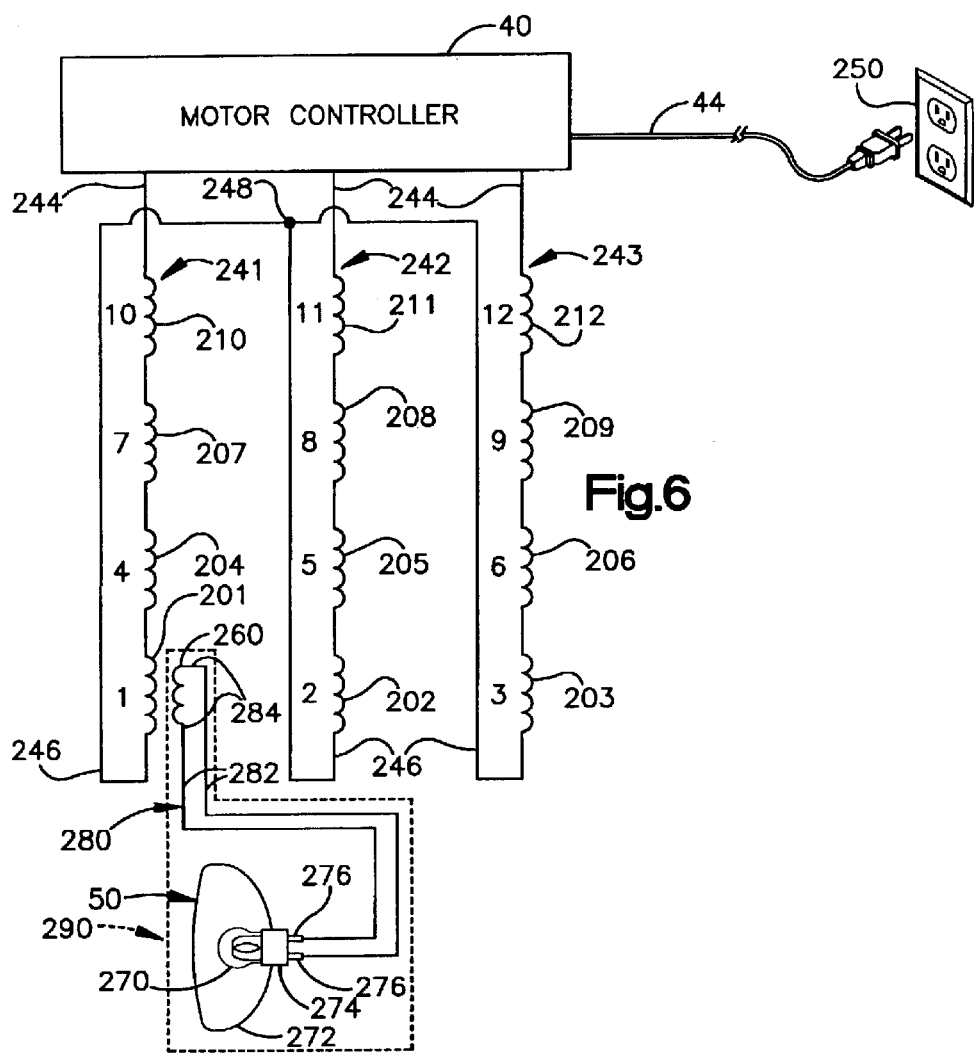
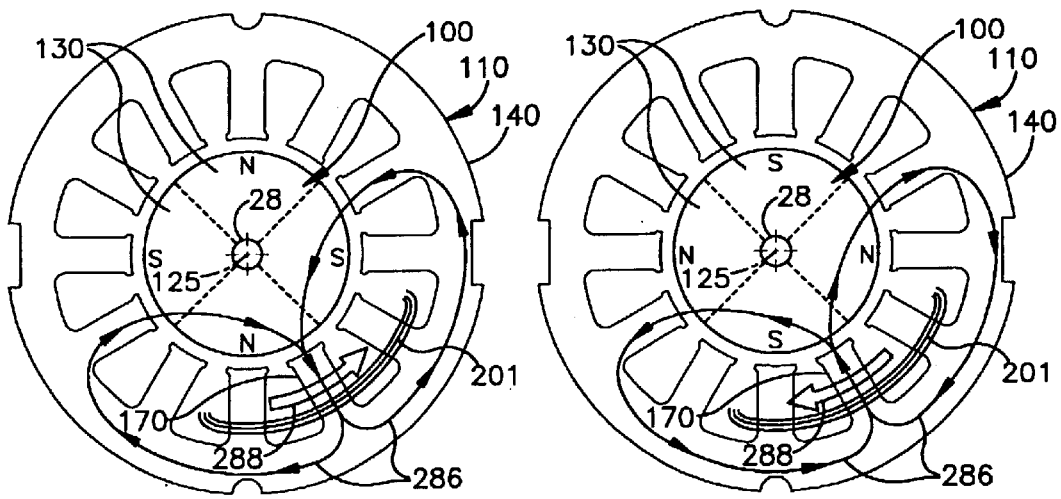
Fig.6
Fig.7A    Fig.7B

MOTOR-BASED ELECTRICAL POWER SUPPLY

TECHNICAL FIELD

The present invention relates to electrical power supplies. The present invention further relates to motors.

BACKGROUND

A prior art vacuum cleaner has a fan. The fan is powered by a rotatable output shaft of an electric universal motor. The motor includes a stationary stator coil. Rotor coils are attached to the shaft. The stator coil magnetically interacts with the rotor coils to rotate the shaft. A source of 120VAC is applied across the stator coil to power the stator coil. The stator coil has a center tap configured to output 12VAC over an output line when 120VAC is applied across the stator coil. The vacuum cleaner also has a headlamp rated at 12VAC. The 12VAC is supplied by the output line of the motor to power the headlamp.

SUMMARY

The present invention provides an apparatus comprising a stator coil. The stator coil is for conducting an electrical input current to activate the stator coil. A movable magnetic structure is for magnetically interacting with the stator coil to produce mechanical output power and is electrically isolated from the stator coil. The mechanical output power is output by an output shaft fixed to the magnetic structure. The apparatus further comprises a pickup coil configured to be electromagnetically coupled to the stator coil and the magnetic structure to induce an electrical output current. The output current is output by an output line electrically connected to the pickup coil. An electrical load is electrically connected to the output line to be powered by the electrical output current.

Preferably, the stator coil, the magnetic structure and the output shaft are parts of a brushless motor. The magnetic structure comprises permanent magnets arranged in a circular array. A core has a tooth that is encircled by the pickup coil and the stator coil. The pickup coil is wrapped about the stator coil. The load performs work other than for producing of the mechanical output power, and is preferably a lamp. The apparatus preferably further comprises a mechanical device, and the mechanical output power is output through the shaft to the device. The mechanical device utilizes the mechanical output power to perform work other than for production of the mechanical output power, and is preferably a fan.

BRIEF DESCRIPTION OF THE DRAWINGS

FIG. 6 is an electrical schematic diagram illustrating how coils shown in FIG. 4 are interconnected according to a first embodiment of the invention;

FIGS. 7A and 7B are schematic top views of the motor shown in FIG. 2 at two different moments in time as the rotor rotates;

DESCRIPTION

Figure 1:
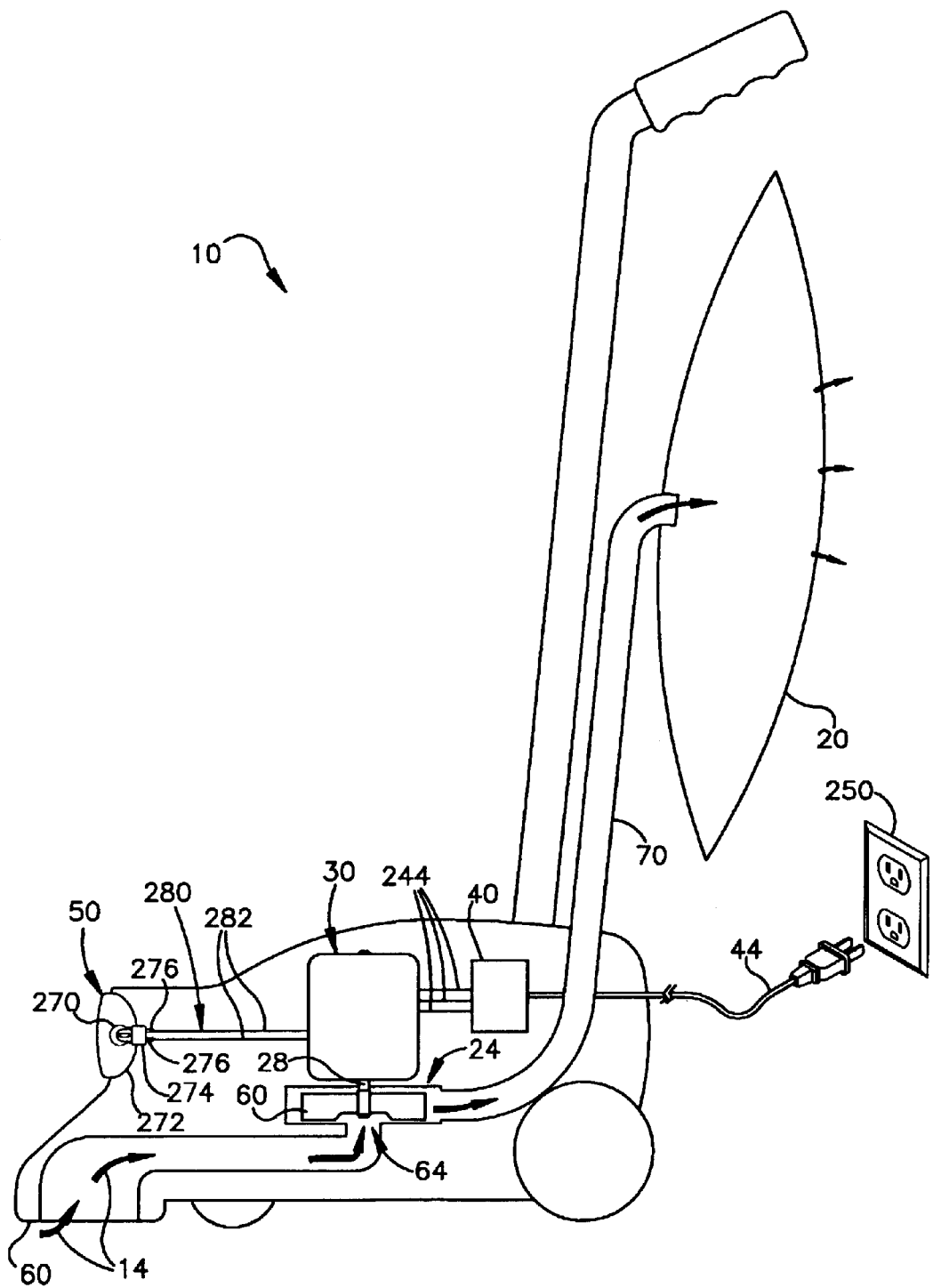
FIG. 1 is a schematic diagram of a vacuum cleaner embodying the present invention.

The apparatus 10 shown in FIG. 1 has parts which, as described below, are examples of the elements recited in the claims.

The invention is exemplified by a vacuum cleaner 10. The vacuum cleaner 10 is used to remove dirt from a floor. The dirt is entrained in a flow of air 14 and conveyed to a filter bag 20. The air flow 14 is generated by a fan 24 driven by an output shaft 28 of a brushless motor 30. The brushless motor 30 is powered by a first electric current at a first voltage produced by a motor controller 40. The motor controller 40 is itself powered by a second electric current at a second voltage provided by a power cord 44. The vacuum cleaner 10 also has a headlamp 50 for illuminating the floor. The headlamp 50 requires a third electric current at a third voltage different than the first and second voltages. The third current at the third voltage is produced by the motor 30, as described below.

The flow path of the dirt-laden air is described in more detail as follows. The air flows through a nozzle 60 of the vacuum cleaner 10 to an inlet 64 of the fan 24. An impeller 60 within the fan 24 is rotated by the output shaft 28 to drive the air through a fill tube 70. The fill tube 70 directs the dirt-laden air into the bag 20. The air escapes through the bag 20 to the atmosphere, and the dirt is retained in the bag 20.

Figure 2:
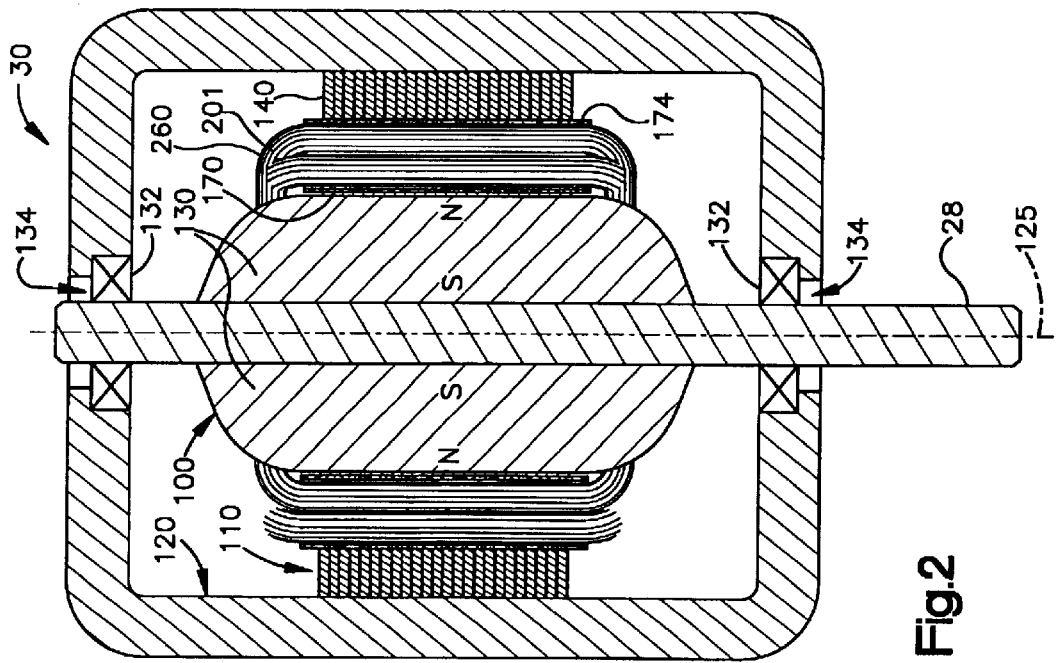
FIG. 2 is a sectional view of a motor shown in FIG. 1, the motor including a rotor and a stator.

As shown in FIG. 2, the motor 30 includes a rotor 100 and a stator 110 held together by a frame 120. The motor 30 is a radial gap permanent magnet brushless motor.

Figure 3:
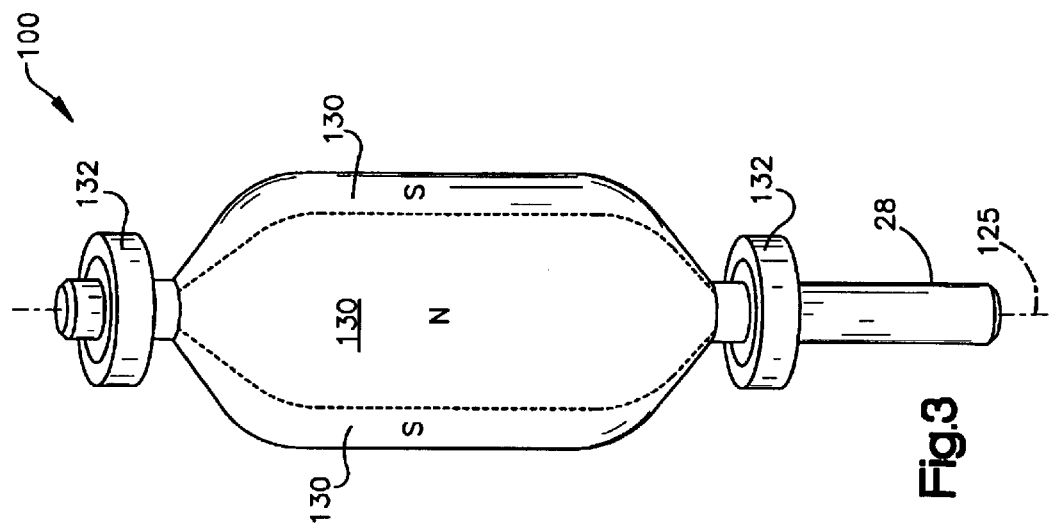
FIG. 3 is a perspective view of the rotor shown in FIG. 2.

The rotor 100 is centered on an axis of rotation 125 and includes the output shaft 28. Fixed to the shaft 28 are four permanent magnets 130 arranged in a circular array centered on the axis 125, as shown in FIG. 3. Two of the magnets 130 with north poles facing radially outward are interposed between two of the magnets 130 with south poles facing radially outward. The four magnets 130 can comprise a four-pole ring magnet having a unitary one-piece structure. Two bearings 132 are mounted on the shaft 28, adjacent to axially opposite sides of the magnets 130. The bearings 132 are seated in bearing pockets 134 in the frame 120 (FIG. 2). The bearings 132 enable the rotor 100 to rotate about the axis 125 relative to the stator 110.

Figure 4:
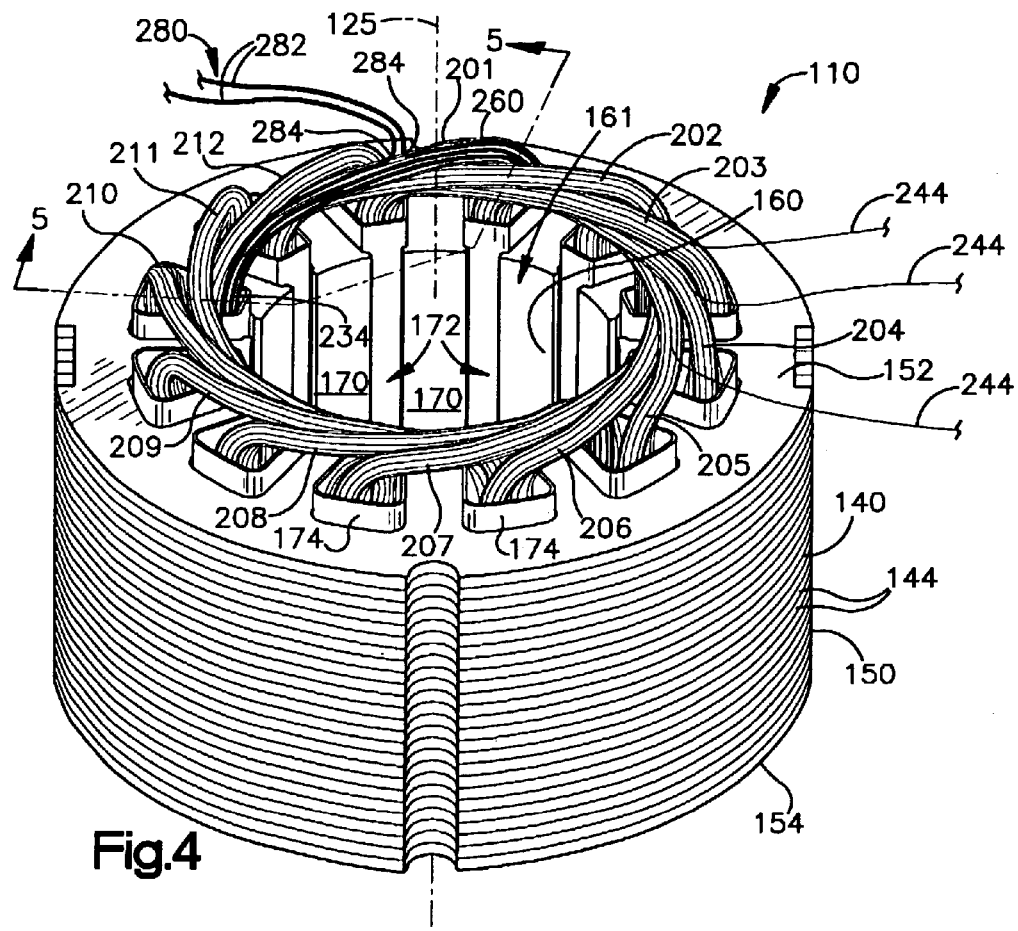
FIG. 4 is a perspective view of the stator shown in FIG. 2.

As shown in FIG. 4, the stator 110 includes a core 140 comprising a stack of steel laminations 144. The core 140 is defined by a cylindrical side surface 150, a flat top surface 152 and a flat bottom surface 154. An inner surface 160 defines an axially-extending opening 161 in the core 140. Circumferentially about the opening 161, the core 140 has a circular array of 12 radially-inwardly extending teeth 170 located symmetrically about the axis 125. A slot 172 is defined by and between each pair of adjacent teeth 170. The slots 172 are thus arranged in circular array centered on the axis 125. The teeth 170 and the slots 172 together define the inner surface of the core 140. Each slot 172 is encircled by an insulator, in this example insulating paper 174.

Figure 5:
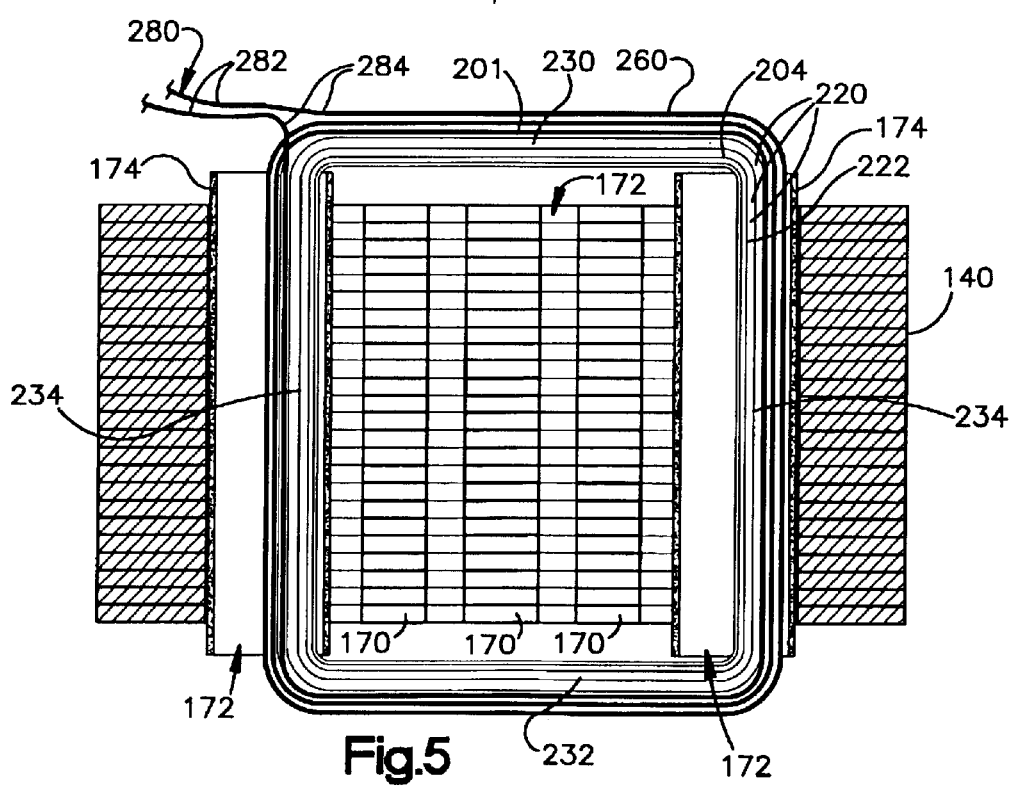
FIG. 5 is a sectional view taken at line 5—5 of FIG. 4.

The stator 110 further includes twelve stator coils 201–212 designated sequentially clockwise about the opening 161 as the first coil 201, second coil 202, and so on through the twelfth coil 212. The stator coils 201–212 are similar in structure and function. They are described as follows with reference to the first stator coil 201. The first stator coil 201 is shown in FIG. 5 along with an adjacent section of the core 140. For clarity, the other stator coils 202–212 are not shown. As shown in FIG. 5, each stator coil 201 is formed of multiple turns 220 of insulated copper wire 222. Each coil 201 has a generally rectangular shape defined by an upper leg 230, a lower leg 232, and two side legs 234. Each coil 201 encircles a respective group of teeth 170, in this example a respective group of three of the teeth 170. The two side legs 234 of the coil 201 are disposed within the slots 172 that border the group of encircled teeth 170. The side legs 234 are surrounded by the insulating paper 174 to electrically isolate the coil from the core 140.

As shown in FIG. 6, the coils 201–212 are organized into three groups, or phases, of four coils each. The four coils of each group are circumferentially spaced symmetrically about the axis 125 (FIG. 2). Accordingly, a first group 241 comprises the first, fourth, seventh and tenth coils 201, 204, 207 and 210. A second group 242 comprises the second, fifth, eighth and eleventh coils 202, 205, 208 and 211. A third group 243 comprises the third, sixth, ninth and twelfth coils 203, 206, 209 and 212.

Within each group 241, 242 and 243 in this example, the coils 201–212 are interconnected in series. The three groups 241, 242 and 243 are each connected at one end by a respective input line 244 to the motor controller 40, and are connected at their opposite ends by three other lines 246 to a common point 248 within the motor 30. Through the input lines 244, the motor controller 40 applies individually to each group 241–243 a time-varying voltage ("first voltage" mentioned above). In this example, the time-varying voltage is drawn from a supply of about 165 VDC, although other supply voltages are possible. The applied voltage is time-varying in that the controller 40 switches the polarity of the voltage according to a time-varying sequence that is a function of the angular position of the rotor 100 (FIG. 2). The sequence comprises alternatively applying +165 V, 0 V and –165 V across each group 241–243 of coils 201–212. The voltage applied to each coil 201–212 thus varies in both amplitude and polarity.

The time-varying voltage applied to the coils 201–212 produces a time-varying input current ("first electric current" mentioned above) to flow through the coils 201–212. The coils 201–212, by and when conducting the current, are considered to be "activated" in that they magnetically interact with the magnets 130 to attract or repel the magnets 130. In terms of both the applied voltage and the resulting current, the coils 201–212 of a single group 241–243 are in phase with each other, and the coils 201–212 of different groups 241–243 are out of phase with each other. Consequently, a single group of coils is often called a "phase." The voltage sequence is predetermined such that the resulting input current flowing through each coil 201–212 will cause that coil 201–212 to interact with the magnets 130 passing near it to apply a continuous unidirectional torque to those magnets 130 and thus to the shaft 28. The resulting rotation of the rotor 100 outputs mechanical output power through the shaft 28 for driving the impeller 60 of the fan 24 (FIG. 1).

The power cord 44, plugged into a wall socket 250, supplies the motor controller 40 with electric current at 120VAC 60 Hz. The controller 40 rectifies the 120VAC current to produce the approximately 165VDC that it regulates and outputs to the coils 201–212 through the input lines 244.

According to the invention, the motor 30 further includes a pickup coil 260. The pickup coil 260 comprises turns—preferably 3–7 turns but any number is possible—of insulated copper wire. As shown in FIGS. 4–6, the pickup coil 260 is wrapped about the first stator coil 201. The coils 201 and 260 thus encircle the same set of teeth 170 and are also coaxial. The pickup coil 260 is a different coil than the stator coils 201–212 and does not function as a stator coil. Functioning as a stator coil would require conducting the input current to become activated and contributing to the mechanical output power, which the pickup coil 260 does not do. In fact, in operation when the stator coil is conducting current, the pickup coil 260 detracts from the mechanical output power.

As shown in FIG. 6, the headlamp 50 comprises a light bulb 270 and a fixture 272. The fixture 272 has a socket 274 into which the light bulb 270 is removably installed. The socket 274 has two terminals 276. In this example, the light bulb 270 is rated at 1 amp at 12VAC. This voltage is not supplied by the wall outlet 250 or the motor controller 40. This voltage is rather supplied by an output line 280. The output line 280 comprises two conductors 282 that connect the two terminals 276 of the socket 274 to two terminal ends 284 of the pickup coil 260.

When the vacuum cleaner 10 is turned on, the motor controller 40 powers the stator coils 201–212 with the voltage sequence described above. This causes the rotor 100 to rotate. Concurrently, the magnets 130 and the current flowing through the stator coils 201–212 together produce a magnetic field. This magnetic field is characterized by magnetic flux lines that exist at various locations within and around the stator 110. As shown in FIG. 7A, some flux lines 286 extend radially through the teeth 170 of the core 140. The flux lines are time-varying in amplitude, because the sources of the flux, the stator current and the magnets, are time-varying. Specifically, the stator current is time-varying in amplitude, and the magnets 130 are time-varying in position.

Besides being time-varying in amplitude, the flux lines are alternating in that they are repeatedly reversing in direction. This is explained as follows by comparison of FIG. 7A to FIG. 7B. In FIG. 7A, a tooth 170 encircled by the first stator coil 201 faces the north pole of one of the magnets 130. The current flowing through the coil 201 and encircling the tooth 170 is flowing in a direction indicated by the broad arrow 288. After the rotor 100 has rotated one quarter turn, as shown in FIG. 7B, the tooth 170 faces the opposite magnetic pole relative to FIG. 7A. Additionally, the coil current 288 is flowing in the opposite direction relative to FIG. 7A. Consequently, the flux lines 286 in the tooth 170 in FIG. 7B are in a direction opposite to that in FIG. 7A. The flux alternates at a frequency equal to the rotational speed of the rotor 100 times the number of pairs of oppositely polarized magnets 130. In this example, the rotor 100 rotates at 200 revolutions/second and has two pairs of oppositely polarized magnets 130, so the flux alternates at 400 Hz.

As shown in FIG. 4, the pickup coil 260 is wrapped about the same teeth 170 as the first stator coil 201. The pickup coil 260 is thus configured, in terms of size, shape and location, to encircle the same time-varying flux lines 286 (FIGS. 7A and 7B) that are encircled by the first stator coil 201. The flux lines 286 encircled by the first stator coil 201 and the pickup coil 260 are produced by the first stator coil 201 itself, the other stator coils 202–212 and the magnets 130.

Consequently, over the course of rotation of the rotor 100, the pickup coil 260 is electromagnetically coupled to both the stator coils 201–212 and the magnets 130 (FIG. 2). This induces an AC voltage across the pickup coil 260 and a resulting AC output current. The number of turns of the pickup coil 260 is selected such that the induced voltage equals the desired voltage, in this example 12VAC, to be output to the lamp 50 shown in FIG. 1. The output voltage of the pickup coil 260 is proportional to the number of its turns, to the magnitude of variation of the flux lines that it encircles, and to the frequency of that variation. The frequency of the output voltage equals the frequency of the alternating flux.

While the motor 30 is producing the mechanical output power, it is also producing the electrical output current at the desired output voltage. The mechanical output power is output by the shaft 28 to a mechanical load, which in this example is the fan 24. The fan 24 is a mechanical device that converts the mechanical output power from torque-driven rotation to another form of power, specifically pressure-driven flow. In doing so, the fan utilizes the mechanical output power to perform useful work other than, and exclusively other than, for producing the mechanical output power. For example, the fan 24 does not store the rotational output power for future use.

The electrical output current is output by the output line 280 to an electrical load to power the load. In this example, the load is the lamp 50, which utilizes the output current to perform useful work other than, and exclusively other than, for the production of the mechanical output power. The useful work is the generation of heat to produce light. The output current is thus output for purposes other than producing the mechanical output power. For example, the output current is not fed back into the motor 30 to power the motor 30. While, as mentioned above, the flux induces the current in the pickup coil 260, the pickup coil current itself affects the flux.

The motor 30 thus functions as, and is thus considered to include, a power supply. The power supply includes the magnets 130 (FIG. 3), the stator coils 201–212 shown in FIG. 4, the pickup coil 260 and the output line 280. This power supply uses the pickup coil 260 to convert a portion of the mechanical power from the moving magnets 130 and a portion of the electromagnetic power from the stator coils 201–212 to electrical output power output through the output line 280. The power supply is a step-down power supply in that its 12 V output voltage, output by the output line 280, is lower than its 165 V input voltage, input by the input lines 244.

The power supply is also an isolated power supply in that its current output is electrically isolated from the input current that powers the power supply. The electrical isolation is due to the coating of insulation on the wires of the stator and pickup coils 201 and 260, which electrically isolates the pickup coil 260 from the stator coil 201 and from the input current. An additional layer of a heat-resistant electrically insulating material (not shown), such as insulating paper, can be disposed between the coils 201 and 260. This helps ensure that the electrical isolation won't be lost in case the insulation coating on the wires melts due to a heat-producing malfunction. The coils 201 and 260 being electrical isolated from each other means the coils 201 and 260 are not electrically connected to each other, either directly or through the intermediary of any electrical circuit, including a semiconductor circuit, no matter how high an electrical resistance that circuit applies between the coils 201 and 260.

As shown in FIG. 6, an output circuit 290 of the power supply is defined as the pickup coil 260, the lamp 50 and the output line 280 that interconnects them. The output circuit 290, and each of its components, is electrically isolated from any electrically charged component, and is thus electrically floating even when the pickup coil 260 is outputting current to power the lamp 50.

This embodiment has one output circuit 290 with one pickup coil 260. However, other embodiments may include more than one output circuit for providing more than one output voltage. Furthermore, each output circuit can comprise more than one pickup coil. Multiple, i.e., two or more, pickup coils that are in phase with each other can be connected in series to increase voltage output or in parallel to increase current producing capability.

Figure 8:
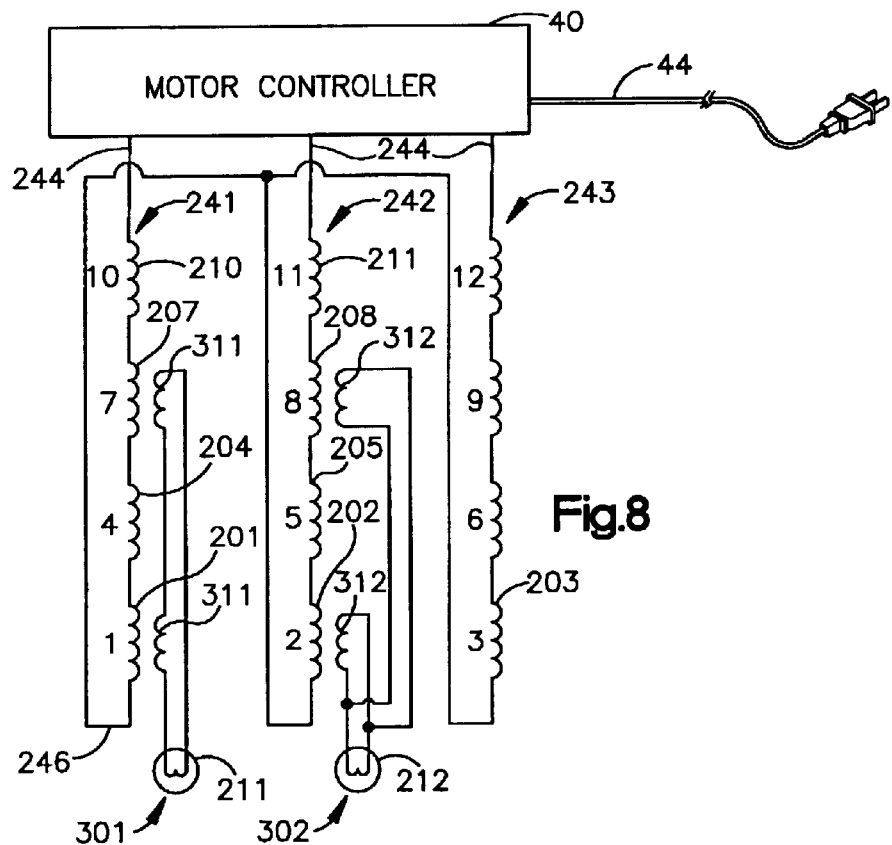
FIG. 8 is an electrical schematic diagram illustrating how coils shown in FIG. 4 are interconnected according to a second embodiment of the invention.

This is exemplified in FIG. 8, in which the motor 30 has multiple output circuits, and each output circuit has multiple pickup coils. Specifically, the motor 30 has first and second output circuits 301 and 302. The first output circuit 301 includes two pickup coils 311 which respectively encircle the same teeth 170 (FIG. 4), and thus the same alternating flux lines, as two stator coils 201 and 207 of the first group 241. The voltage outputs of the pickup coils 311 are therefore in phase with each other. They are connected in series to power a load 211, in this case, a lamp. Similarly, the second output circuit 302 includes two pickup coils 312 which respectively encircle the same flux lines as do two stator coils 202 and 208 of the second group 242. The voltage outputs of these pickup coils 320 are therefore also in phase with each other. They are connected in parallel to power a load 212. In this example, the coils 201, 207, 202 and 208 of each output circuit 301 and 302 are circumferentially spaced symmetrically about the axis 125 (FIG. 4).

Figure 9:
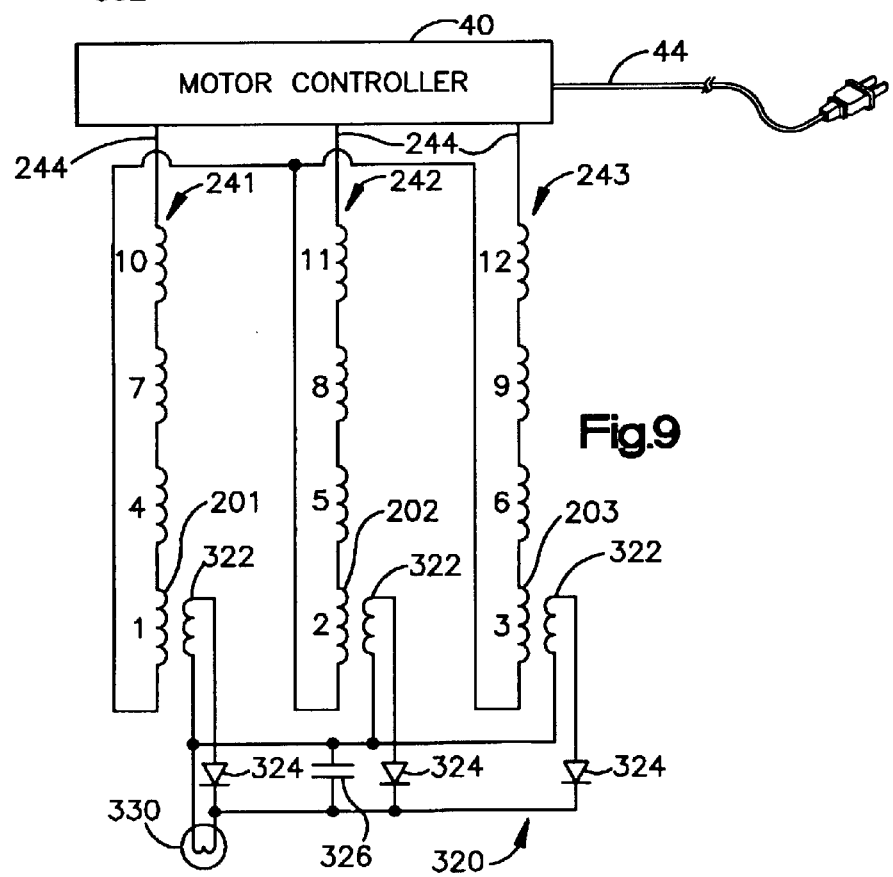
FIG. 9 is an electrical schematic diagram illustrating how coils shown in FIG. 4 are interconnected according to a third embodiment of the invention.

FIG. 9 shows an output circuit 320 with three pickup coils 322. The pickup coils 322 respectively encircle the same flux lines as do stator coils 201, 202 and 203 of different groups 241, 242 and 243. The output voltages of the pickup coils 322 are therefore out of phase with each other. The pickup coils 322 are connected in parallel with their outputs individually rectified with rectifiers 324. A capacitor 326 reduces ripple in the output voltage, which powers a load 330.

As mentioned above, the pickup coil 260 encircles the same alternating flux lines that are encircled by the first stator coil 201. As shown in FIG. 5, this is achieved by the pickup coil 260 being wrapped about, and thus overlying, the stator coil 201. However, this can alternatively be achieved by the pickup coil 260 underlying the stator coil 201. This can also be achieved by the pickup coil 260 being located in front of or behind the stator coil 201.

In the present embodiment, the pickup coil 260 is wrapped about and thus in contact with the stator coil 201. Alternatively, the pickup coil 260 can be spaced from the stator coil 201 while encircling the same alternating flux lines that are encircled by the stator coil 201.

As mentioned above, the pickup coil 260 encircles the same flux lines that are encircled by the first stator coil 201. However, in another embodiment, the pickup coil 260 may encircle fewer than all the teeth, and/or fewer than all the flux lines, encircled by the stator coil 201. The pickup coil 260 may alternatively encircle more teeth, and/or more flux lines, than are encircled by the stator coil 201.

In other embodiments, the pickup coil 260 may be disposed about a flux-conducting section of the core 140 other than the teeth 170. Alternatively, the pickup coil 260 might not encircle any section of the core 140. The pickup coil 260 might rather be configured, in terms of size, shape and location, such that it encircles time-varying flux lines that extend out of the core 140 without the pickup coil 260 itself encircling the core 140.

In the preferred embodiments above, the load is a lamp. However, other loads are possible. For example, the load can be low-voltage, typically 5–18 V, circuitry of the motor controller 40 (FIG. 6).

In the preferred embodiments above, the voltage of the output current is lower than the voltage of the input current. In an alternative embodiment, the voltage of the output current is higher than the voltage of the input current. This can be achieved by increasing the number of turns of the pickup coil or by increasing the number of pickup coils connected in series.

In the preferred embodiments above, permanent magnets magnetically interact with stator coils to produce mechanical output power. However, in place of the magnets, other magnetic structures, such as rotor coils, may be used. The motor 30 is preferably a permanent magnet brushless motor, but other motors, with other principles of operation, other geometries, other core shapes, and other stator coil interconnections may be used.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

What is claimed is:

1. An apparatus comprising:
   a stator coil for conducting an electrical input current to activate said stator coil;
   a movable magnetic structure for magnetically interacting with said stator coil to produce mechanical output power;
   a pickup coil configured to be electromagnetically coupled to said stator coil and said magnetic structure to induce an electrical output current, said pickup coil being electrically isolated from said stator coil;
   an output line electrically connected to said pickup coil to output said output current; and
   an electrical load electrically connected to said output line to receive and be powered by said electrical output current.

2. The apparatus of claim 1 wherein said stator coil and said magnetic structure are parts of a brushless motor.

3. The apparatus of claim 1 wherein said magnetic structure comprises a permanent magnet.

4. The apparatus of claim 3 wherein said magnetic structure comprises permanent magnets arranged in a circular array.

5. The apparatus of claim 4 comprising multiple stator coils including said stator coil, each of said stator coils being configured to conduct an electrical input current to activate said stator coil, and said pickup coil being configured to be electromagnetically coupled to at least one of said stator coils and at least one of said magnets to induce said electrical output current, and said pickup coil being electrically isolated from said stator coils.

6. The apparatus of claim 1 further comprising a core having a tooth that is encircled by said pickup coil.

7. The apparatus of claim 6 wherein said tooth is also encircled by said stator coil.

8. The apparatus of claim 1 wherein said pickup coil is wrapped about said stator coil.

9. The apparatus of claim 1 wherein, during operation of said apparatus, said stator coil and said magnetic structure produce time-varying flux lines that are encircled by said stator coil, and said pickup coil encircles the same time-varying flux lines that are encircled by said stator coil.

10. The apparatus of claim 1 wherein, during operation of said apparatus, said stator coil and said magnetic structure produce time-varying flux lines that are encircled by said pickup coil and that are repeatedly reversing in direction.

11. The apparatus of claim 1 wherein said load is electrically floating when said output current is being output.

12. The apparatus of claim 1 further comprising an output shaft fixed to said magnetic structure to output said mechanical output power, and wherein said output line outputs said output current to said electrical load while said output shaft is outputting said mechanical output power.

13. The apparatus of claim 1 wherein said load performs work other than for producing said mechanical output power.

14. The apparatus of claim 13 wherein said load is a lamp.

15. The apparatus of claim 1 further comprising a mechanical device that is connected to said magnetic structure to receive said mechanical output power and that utilizes said mechanical output power to perform work other than for producing said mechanical output power.

16. The apparatus of claim 15 wherein said mechanical device is a fan.

17. The apparatus of claim 16 wherein said load is a lamp.

18. The apparatus of claim 1 wherein said pickup coil is configured not to contribute to said mechanical output power.

19. An apparatus comprising:
   a stator coil for conducting an electrical input current to activate said stator coil;
   a movable magnetic structure for magnetically interacting with said stator coil to produce mechanical output power;
   a pickup coil configured to be electromagnetically coupled to said stator coil and said magnetic structure to induce an electrical output current;
   an output line electrically connected to said pickup coil to output said output current; and
   an electrical load electrically connected to said output line to receive and be powered by said electrical output current, said load being configured to perform work other than for producing said mechanical output power.

20. The apparatus of claim 19 wherein said magnetic structure comprises multiple permanent magnets.

21. The apparatus of claim 19 comprising multiple stator coils including said stator coil and multiple pickup coils including said pickup coil, each of said stator coils being configured to conduct an electrical input current to activate said stator coil, and each of said pickup coils being configured to be electromagnetically coupled to at least one of said stator coils and at least one of said magnets to induce said electrical output current, and each of said pickup coils being electrically isolated from said stator coils and being configured to perform work other than for producing said mechanical output power.

22. The apparatus of claim 19 further comprising a core having a tooth that is encircled by said pickup coil.

23. The apparatus of claim 22 wherein said tooth is also encircled by said stator coil.

24. The apparatus of claim 19 wherein said pickup coil is wrapped about said stator coil.

25. The apparatus of claim 19 wherein, during operation of said apparatus, said stator coil and said magnetic structure produce time-varying flux lines that are encircled by said stator coil, and said pickup coil encircles the same time-varying flux lines that are encircled by said stator coil.

26. The apparatus of claim 19 wherein, during operation of said apparatus, said stator coil and said magnetic structure produce time-varying flux lines that are encircled by said pickup coil and that are repeatedly reversing in direction.

27. The apparatus of claim 19 wherein said output current has an output voltage lower than an input voltage of said input current.

28. The apparatus of claim 19 wherein said pickup coil is electrically isolated from said stator coil.

29. The apparatus of claim 19 wherein said load is electrically floating when said output current is being output.

30. The apparatus of claim 19 further comprising an output shaft fixed to said magnetic structure to output said mechanical output power, and wherein said output line outputs said output current to the electrical load while said output shaft is outputting said mechanical output power.

31. The apparatus of claim 19 further comprising a mechanical device that is connected to said magnetic structure to receive said mechanical output power and that utilizes said mechanical output power to perform work other than for producing said mechanical output power.

32. The apparatus of claim 31 wherein said mechanical device is a fan and said electrical load is a lamp.

33. The apparatus of claim 19 wherein said load is configured to perform work exclusively other than for producing said mechanical output power.

* * * * *